US012696896B2

(12) United States Patent
Schmitt et al.

(10) Patent No.: US 12,696,896 B2
(45) Date of Patent: Aug. 4, 2026

(54) SUPPORT ELEMENT FOR A PLURALITY OF ANIMAL SEMEN PACKAGING STRAWS AND ASSEMBLY COMPRISING SAID SUPPORT ELEMENT

(71) Applicant: IMV TECHNOLOGIES, Saint Ouen sur Iton (FR)

(72) Inventors: Eric Schmitt, Villaines-la-Juhel (FR); Jean-Louis Douesnel, Breteuil-sur-Iton (FR); Jean-Charles Gorges, Chenay (FR)

(73) Assignee: IMV TECHNOLOGIES, Saint Ouen sur Iton (FR)

( * ) Notice: Subject to any disclaimer, the term of this patent is extended or adjusted under 35 U.S.C. 154(b) by 1029 days.

(21) Appl. No.: 17/640,002

(22) PCT Filed: Sep. 9, 2020

(86) PCT No.: PCT/EP2020/075225
§ 371 (c)(1),
(2) Date: Mar. 3, 2022

(87) PCT Pub. No.: WO2021/048223
PCT Pub. Date: Mar. 18, 2021

(65) Prior Publication Data
US 2022/0322659 A1     Oct. 13, 2022

(30) Foreign Application Priority Data

Sep. 9, 2019     (FR) ...................................... 1909908

(51) Int. Cl.
*A01N 1/146*         (2025.01)
*B65D 25/10*         (2006.01)

(52) U.S. Cl.
CPC ........... *A01N 1/146* (2025.01); *B65D 25/108* (2013.01)

(58) Field of Classification Search
CPC ...... A01N 1/147; A01N 1/142; A61D 19/024; B65D 25/108
See application file for complete search history.

(56) References Cited

FOREIGN PATENT DOCUMENTS

| | | | | |
|---|---|---|---|---|
| CN | 214413931 U | * | 10/2021 | |
| CN | 215836773 U | * | 2/2022 | |
| EP | 2450648 A2 | * | 5/2012 | ........... A01N 1/0252 |
| JP | H05285163 A | * | 11/1993 | |

* cited by examiner

*Primary Examiner* — Charles Capozzi
*Assistant Examiner* — Tingchen Shi
(74) *Attorney, Agent, or Firm* — FisherBroyles, LLP; Roger L. Browdy; James E. Mrose

(57) ABSTRACT

A support element for a plurality of packaging straws, the support element comprising a plate (31) and two flanges (37) rigidly connected to said plate (31) and comprising a fluted surface (53) having a plurality of similar grooves (36), each flange (37) comprising a central part as well as a first projecting part (42) and a second projecting part (43), each extending from one side of the central part, characterised in that the first projecting part comprises a bracket (42) having a bearing face and the second projecting part comprises another bracket (43) having another bearing face, said bearing face and said other bearing face being upwards facing and, in the direction of height, said bearing face being further from said plate (31) than said other bearing face. The assembly comprises the support element and a freezing rack (4).

25 Claims, 8 Drawing Sheets

[Fig. 1]
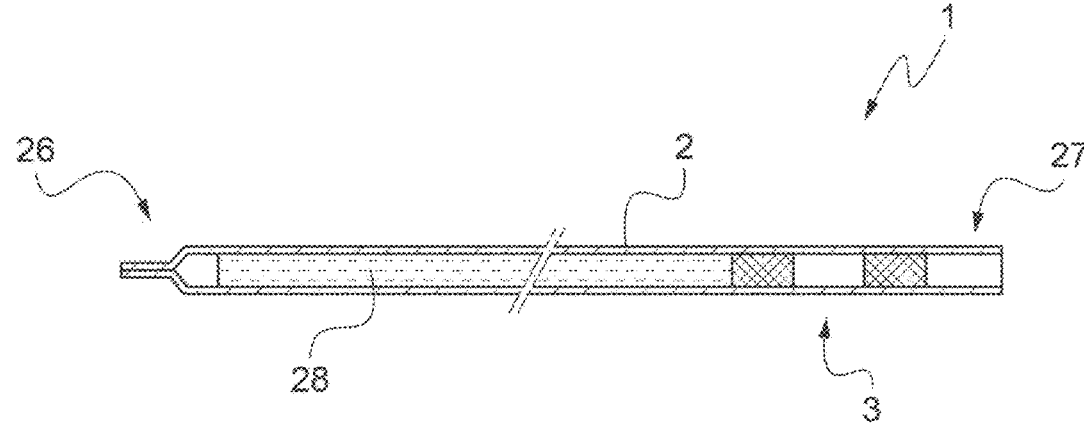
[Fig. 2]
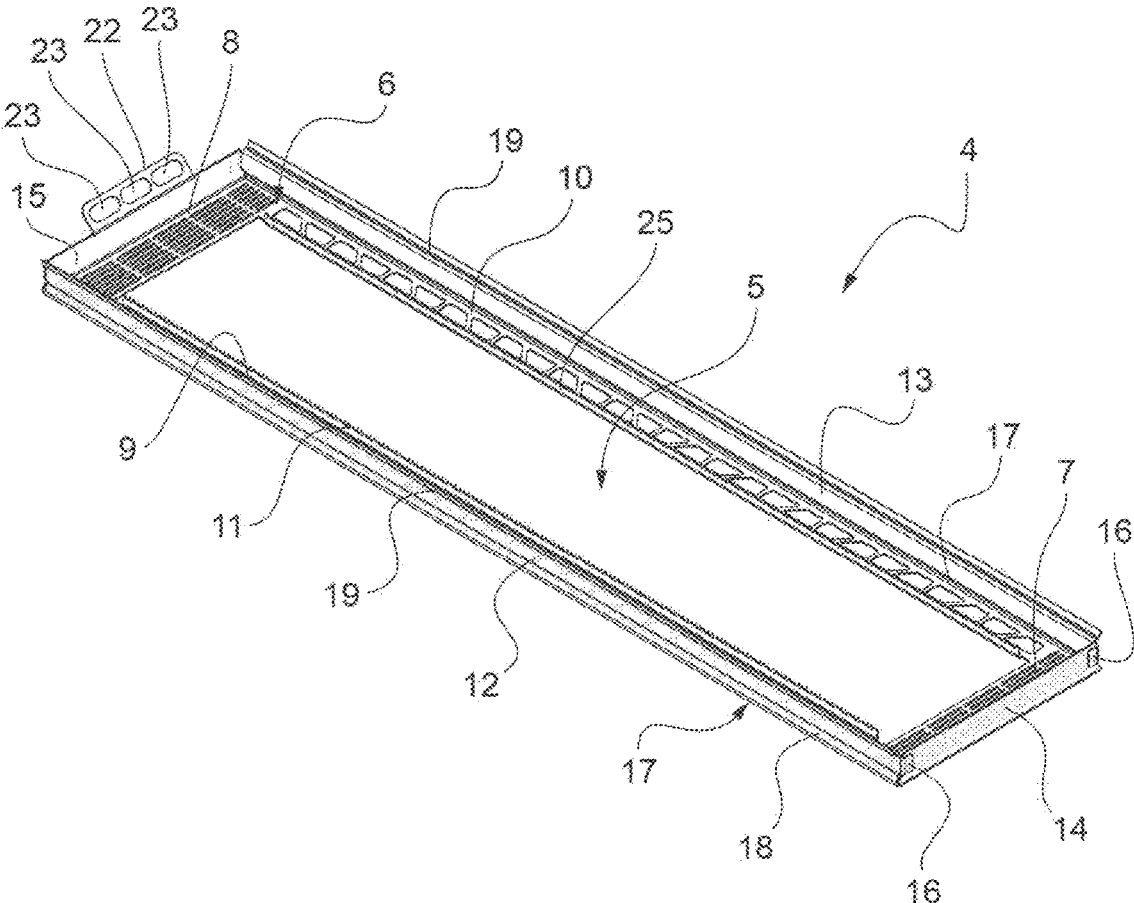

[Fig. 3]
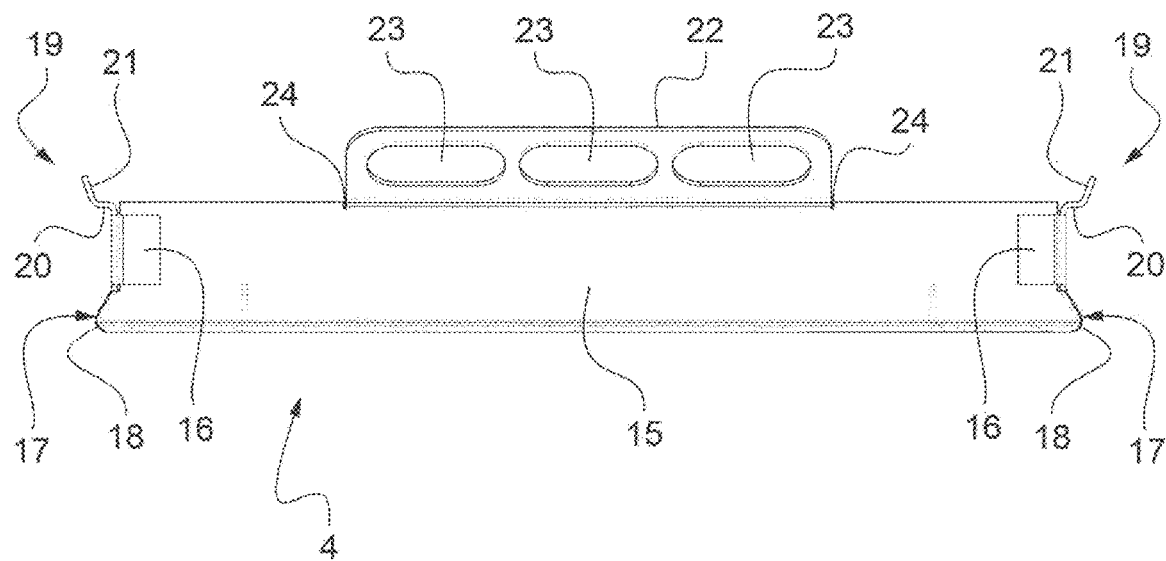
[Fig. 4]
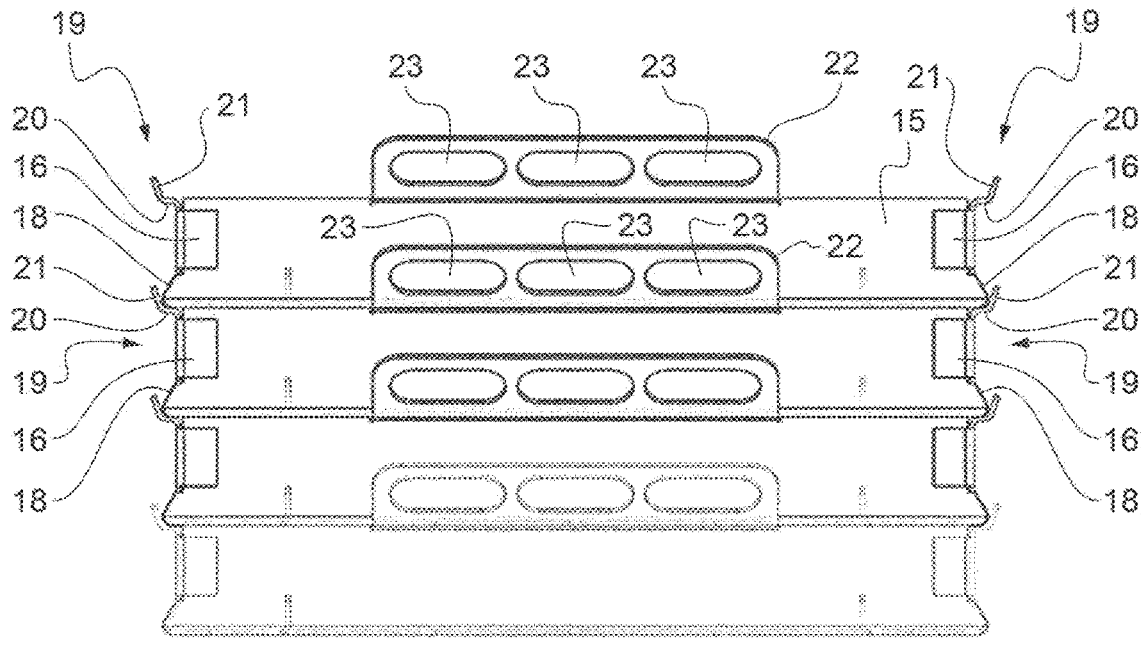

[Fig. 7]
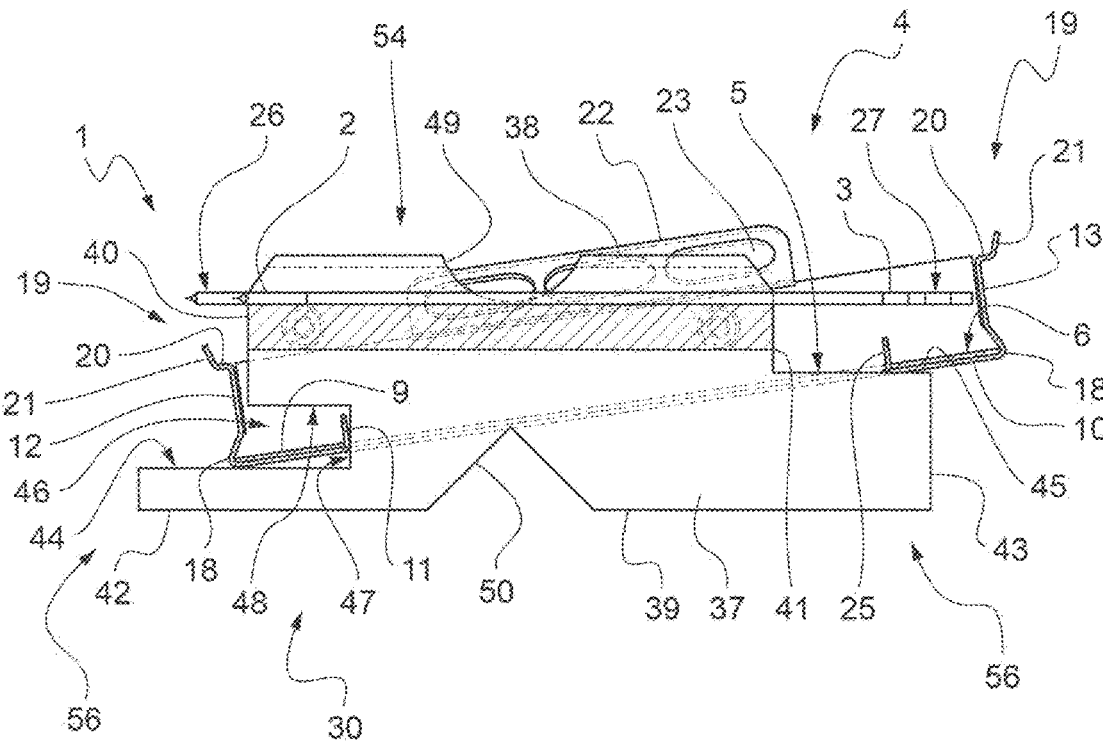
[Fig. 8]
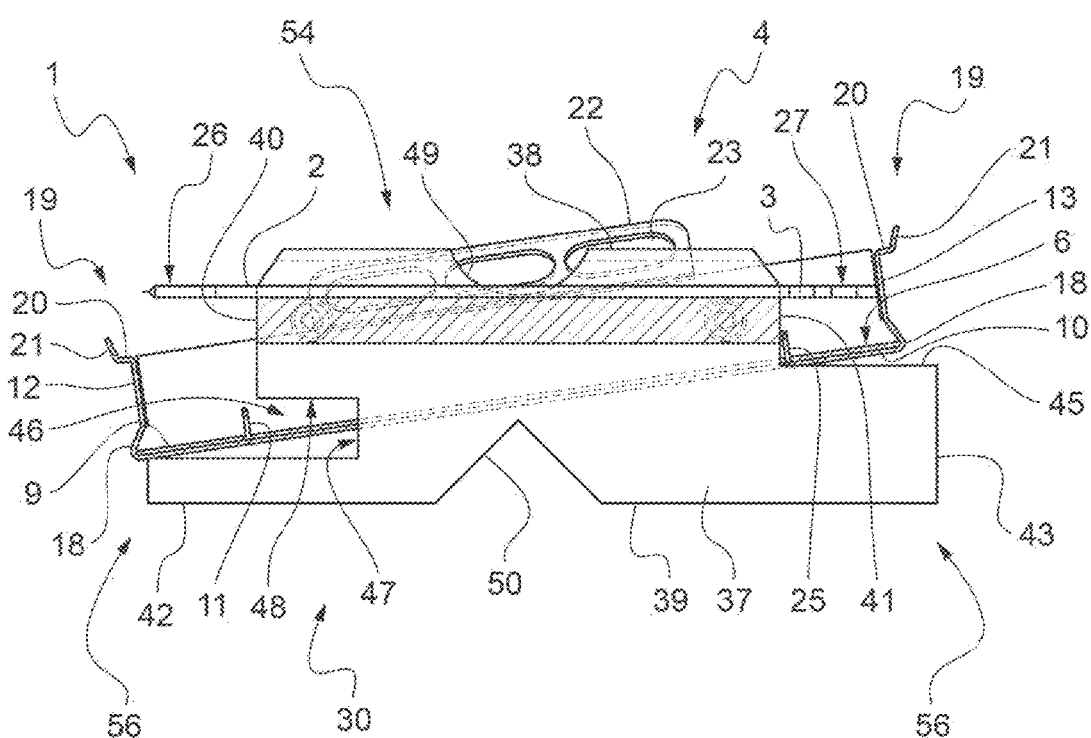

[Fig. 11]
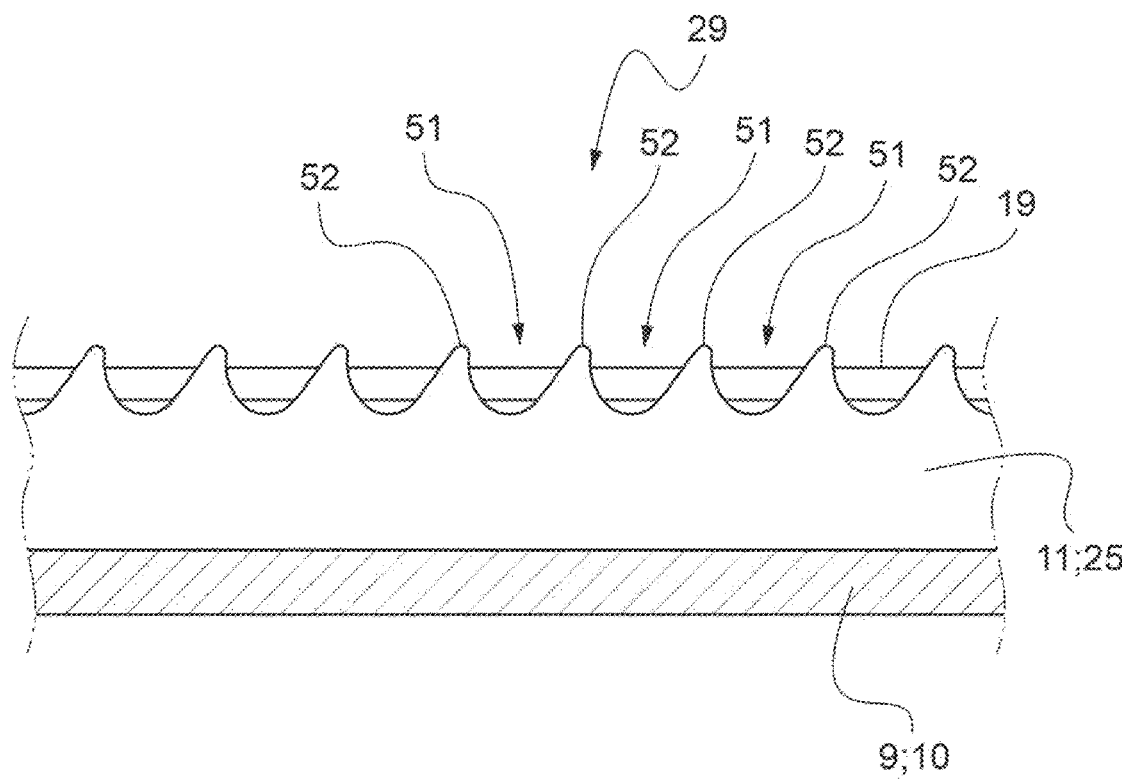
[Fig. 12]
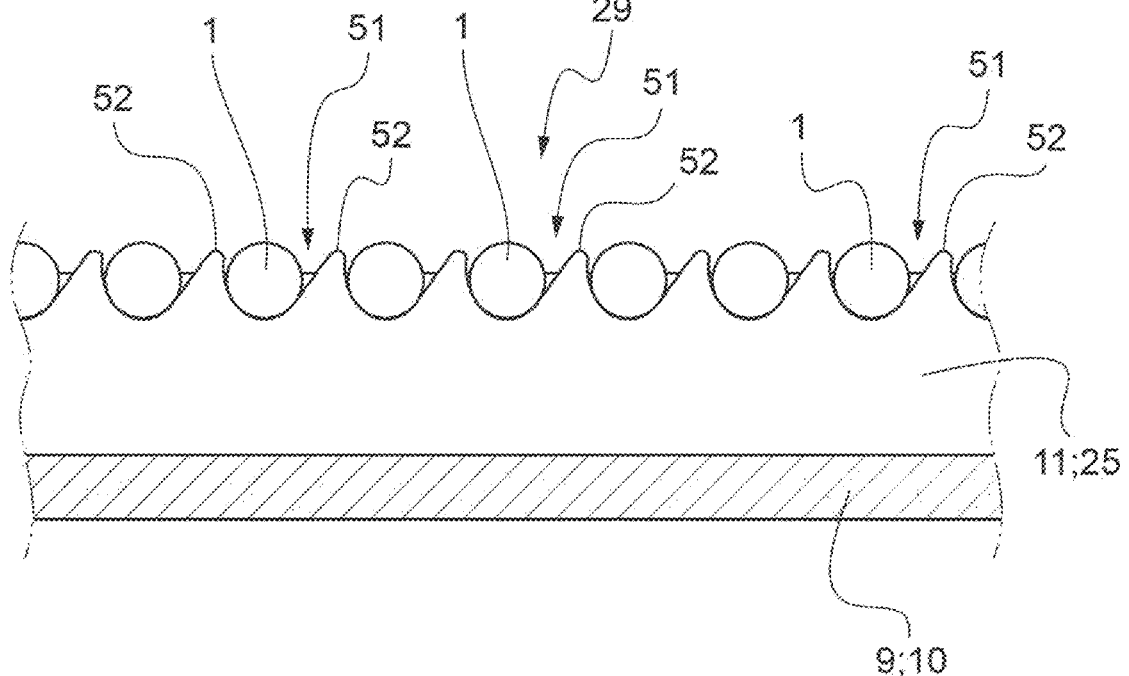

SUPPORT ELEMENT FOR A PLURALITY OF ANIMAL SEMEN PACKAGING STRAWS AND ASSEMBLY COMPRISING SAID SUPPORT ELEMENT

TECHNICAL FIELD OF THE INVENTION

The invention concerns the preservation of animal semen

STATE OF THE ART

It is known that for certain animal species, for example in particular bovine and equine livestock, semen is treated after collection by diluting that then the diluted semen is subdivided into doses each filling a straw formed by a thin tube of plastic material and by a stopper engaged in that tube, the dose of semen being disposed between the stopper and the end of the tube furthest from the stopper, the corresponding end section being closed off after filling by crushing and welding.

The preservation of the doses of semen contained in the straws is carried out by immersion of the straws in a bath of liquid nitrogen.

Prior to that immersion, the straws are frozen by being placed in a freezer in which passes a stream of liquid nitrogen vapor.

In practice, to freeze the straws a plurality is disposed on a rack referred to as freezing rack then the freezing rack carrying the straws is placed in the freezer. In general, the freezer is dimensioned to receive several freezing racks superposed.

Such a freezing rack is already known that comprises two toothed walls extending along a free central space, each toothed wall having a set of toothing at its apex, the sets of toothing of the toothed walls being identical with each hollow delimited by a surface having a curvature according to the diameter of the straws.

In order to assist the operator to dispose the straws on the freezing rack, a support member is already known, in general called a gauge, which comprises a plate and two flanges rigidly connected to the plate, which plate has a width less than the length of the straws and comprises a fluted surface having a plurality of channels each of which is similar and oriented in the direction of the width of the plate and each delimited by a surface having a curvature according to the diameter of the straws, the channels being disposed side by side with the same pitch as the sets of toothing of the freezing rack. The support member and the freezing rack are configured such that the support member can be inserted into the central free space of the freezing rack. The flanges are configured such that the support member can be placed on the horizontal reception surface with the fluted surface located atop the plate at a predetermined level above the reception surface, Each flange comprises a central part as well as a first projecting part and a second projecting part each extending on one side of the central part, these projecting parts being provided to receive the base of the freezing rack of which the sets of toothing are then under the fluted surface.

In this position, the operator places the straws in disorder on the fluted surface and spreads them thereon in order for each straw to be accommodated in one of the channels.

As the plate has a width less than the length of the straws, the operator can arrange the straws such that each has an end section that projects from said plate on each side.

The freezing rack is then raised and collects the straws of which each then has on each side an end section received in a hollow of one of the sets of toothing.

DISCLOSURE OF THE INVENTION

The invention is directed to further improving the putting in place of the straws on the freezing rack.

To that end, the invention provides a support member for a plurality of straws for packaging animal semen each having a predetermined diameter and a predetermined length, the support member comprising a plate and two flanges rigidly connected to said plate, which has a width less than said predetermined length and comprising a fluted surface having a plurality of similar channels each of which is oriented in the direction of the width of the plate and each delimited by a surface having a curvature according to said predetermined diameter, said channels being disposed side by side with a predetermined pitch, said flanges being configured such that said support member can be placed on a horizontal reception surface with said fluted surface located atop the plate at a predetermined level above said reception surface, whereby each said channel can receive a said straw of which an end section projects from said plate on each side, each flange comprising a central part as well as a first projecting part and a second projecting part each extending on one side of the central part, characterized in that the first projecting part comprises a foot having a bearing face and the second projecting part comprises another foot having another bearing face, said bearing face and said other bearing face being turned upward when said support member is placed on said horizontal reception surface, said bearing face being farther from said plate than said other bearing face in the direction of the height.

Whereas with the aforementioned known support member the projecting parts of the flanges receive the base of the freezing rack at the same level on each side with the two sets of toothing being located under the fluted surface while the apex of the peripheral rim of the freezing rack is at the same level as the plate, the support member according to the invention receives the freezing rack in a different position: the bearing faces being at different levels the freezing rack is inclined, which makes it possible to place one of the peripheral rims fully under the plate and thus free space available to the operator to arrange the straws, which considerably facilitates his or her task.

According to advantageous features:

a cut-out is provided in the central part of each flange perpendicular to said bearing face;

said cut-out has a predetermined depth and said bearing face has a length at least equal to said depth;

said other bearing face has a length at least equal to said depth;

the plate comprises between seventy and two hundred and five channels;

The invention also relates to an assembly comprising a support member as disclosed above and a freezing rack for said plurality of straws comprising two toothed walls extending along a central free space, said support member and said freezing rack being configured such that said support member can be inserted into said central free space, each toothed wall having a set of toothing at its apex comprising a succession of teeth and hollows, the sets of toothing of said toothed walls being identical to each hollow delimited by a surface having a curvature according to said predetermined diameter, the pitch of the sets of toothing being identical to the predetermined pitch of said channels of said plate, the central free space of the freezing rack being configured to receive said plate and a central part of each of the flanges of the support member, each flange comprising, in addition to its central part, two projecting parts respectively a first projecting part and a second projecting part, extending on each side of said central part and being configured to receive the freezing rack, characterized in that said first projecting part comprises a foot having a bearing face and said second projecting part comprises another foot having another bearing face, said bearing face and said other bearing face being turned upward when said support member is placed on said horizontal reception surface, said bearing face being farther from said plate than said other bearing face in the direction of the height, such that the freezing rack disposed on the support member is inclined.

According to advantageous features:

the freezing rack and the support member are configured to have a relative position of putting in place the straws and a position of aligning the straws, a cut-out being provided in each of the flanges perpendicular to the bearing face;

the cut-out has a predetermined depth corresponding to at least the distance between one of the toothed walls and a longitudinal wall of the rack, in said relative position of putting in place the straws said toothed wall is configured to come into stopped engagement against a back face of said cut-out holding the other toothed wall at a distance from the plate, and in said position of aligning the straws another longitudinal wall is configured to come into contact with the straws;

said freezing rack comprises a bottom wall of frame form surrounding the central free space, said bottom wall being configured to connect said toothed walls to the longitudinal walls; and/or the other bearing face is provided to receive one of the zones of the freezing rack located at the junction of the bottom wall and of one of the toothed walls.

BRIEF DESCRIPTION OF THE DRAWINGS

The disclosure of the invention will now be continued with the detailed description of embodiments, given below by way of illustrative and non-limiting example, with reference to the accompanying drawings, in which:

FIG. 1 is a view in longitudinal cross-section of a conventional straw that is filled and closed off;

FIG. 2 is a perspective view of a freezing rack provided to receive a plurality of straws such as illustrated in FIG. 1 and then to be placed in a freezer;

FIG. 3 is a front view of that freezing rack;

FIG. 4 is a similar view to FIG. 3 but showing several similar freezing racks stacked on top of each other;

FIG. 7 is a cross-section view in elevation of the freezing rack and of the support member in the same position as in FIG. 6 after the straws have been put in place on the plate of the support member;

FIG. 8 is a similar view to FIG. 7 but with the freezing rack and the support member in a relative position of longitudinal alignment of the straws put in place on the plate of the support member;

FIG. 11 is a cross-section view in elevation of a portion of the freezing rack before the straws have been put in place; and FIG. 12 is a similar view to FIG. 11 but with the straws put in place.

DETAILED DESCRIPTION

Figure 5:
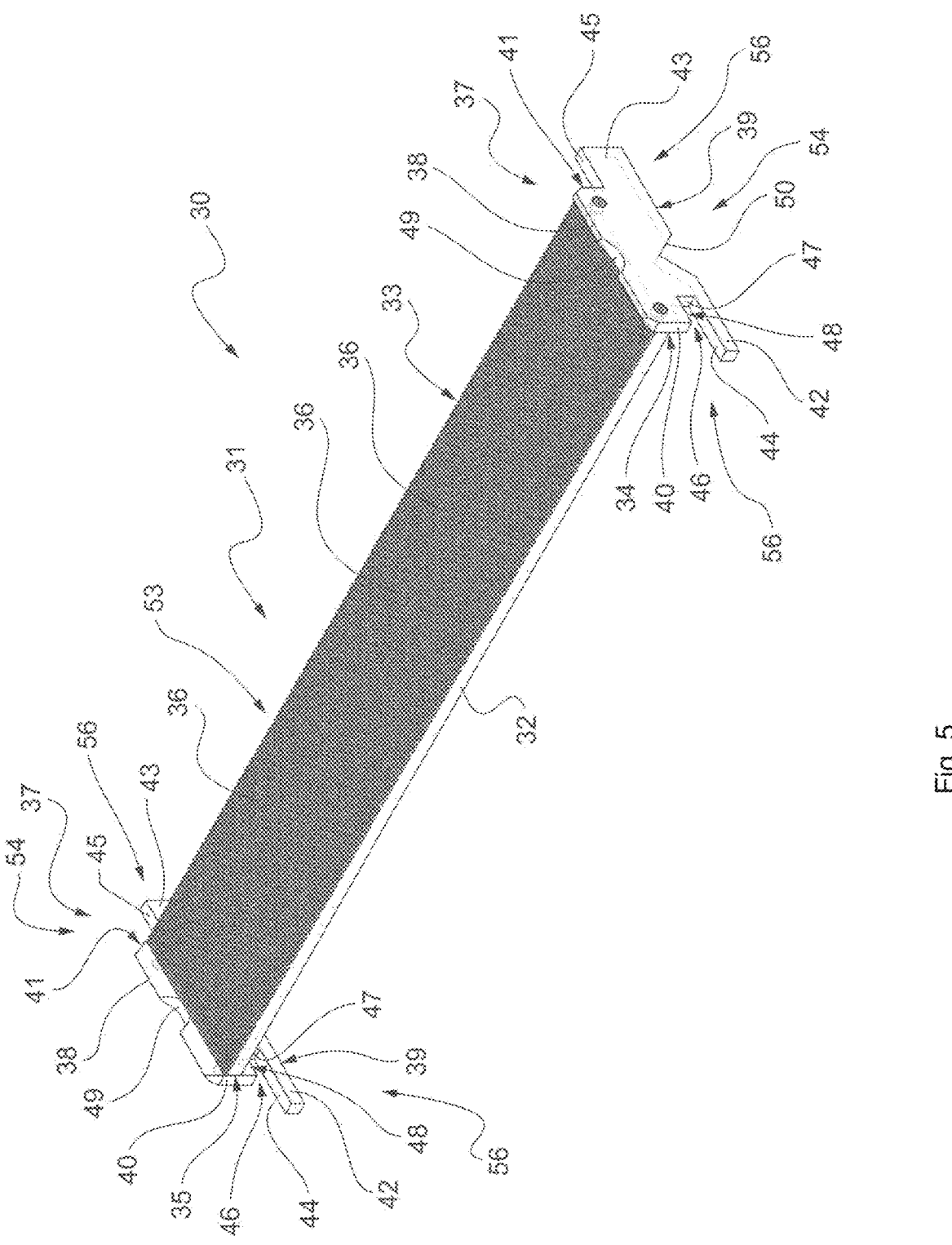
FIG. 5 is a perspective view of a support member provided to facilitate the putting of the straws in place on the freezing rack shown in FIGS. 2 and 3.

FIG. 1 shows, in the filled and dosed-off state, a packaging straw 1 for animal semen formed by a thin tube 2 of plastic material and by a stopper 3 engaged in the tube 2, the straw 1 containing a dose 28 of diluted animal semen, here bull semen, disposed between the stopper 3 and an end section 26 dosed off by crushing and welding.

The end section 26 is the furthest from the stopper 3. The end section 27, which is the closest to the stopper, is not dosed off here (from this side; it is the stopper 3 which retains the dose 28 of semen).

The straw 1, and more specifically the tube 2, has a length of the order of 133 mm and an inside diameter which is of the order of 1.6 mm with a wall thickness of the order of 0.175 mm such that the diameter of the straw 1, and more specifically the outside diameter of the tube 2, is of the order of 1.95 mm.

In practice, given the manufacturing tolerances, the outside diameter of the tube 2 of the straw 1 is comprised between 1.90 and 2 mm and its length is comprised between 132 and 134 mm.

The dose of semen 28 contained in the straw 1 is a dose of fresh semen the preservation of which is provided by immersion of the straw 1 in a bath of liquid nitrogen.

Prior to that immersion, the straws are to be frozen by being placed in a freezer in which passes a stream of liquid nitrogen vapor.

In practice, a plurality of straws 1 is disposed on a rack referred to as freezing rack then the freezing rack carrying the straws is placed in the freezer. In general, the freezer is dimensioned to receive several freezing racks superposed.

FIGS. 2 to 4 show a freezing rack specially designed to cooperate with accessories provided to facilitate the manipulation of the straws.

Here, the freezing rack 4 is made from metal sheet cut out and bent.

The freezing rack 4 has the general form of a plate having a rim and a bottom surrounding a central free space 5.

The bottom comprises a bottom wall 6 in the form of a rectangular frame surrounding the central free space 5. The bottom wall 6 is apertured so as to enable the passage of liquid nitrogen vapor in the freezer.

The bottom wall 6 comprises two transverse sections 7 and 8 and two longitudinal sections 9 and 10. The transverse sections 7, 8 are opposite each other and connect the longitudinal sections 9, 10 which are opposite each other.

In the bottom of the freezing rack 4, the longitudinal sections 9, 10 are each bordered internally by a toothed wall 11, 25 extending transversely of the bottom wall 6.

The apex of each of the toothed walls 11, 25 has a set of toothing 29 comprising a succession of teeth 52 and hollows 51, each hollow 51 being configured to accommodate an end section 26, 27 of a straw 1, as illustrated in FIGS. 11 and 12.

Each hollow 51 of the set of toothing 29 of the toothed wall 11 is opposite a hollow 51 of the set of toothing 29 of the toothed wall 25 and each hollow 51 is delimited by a surface having a curvature according to the diameter of the straws. The pitch of the set of toothing 29 of the toothed wall 11 is identical to the pitch of the set of toothing 29 of the toothed wall 25.

Thus, each hollow 51 of the set of toothing 29 of the toothed wall 11 makes it possible to accommodate an end section 26 and each hollow 51 opposite the toothed wall 25 makes it possible to accommodate an end section 27.

The rim of the freezing rack 4 comprises two longitudinal walls 12, 13 disposed opposite each other, connected by two transverse walls 14 and 15 opposite each other. The transverse walls 14, 15 extend from the transverse sections 7, 8 of the bottom wall 6 and the longitudinal wads 12 and 13 extend from the longitudinal sections 9 and 10 of the bottom wall 6.

The transverse walls 14, 15 and the longitudinal walls 12, 13 extend transversely to the bottom wall 6 of the freezing rack 4.

Furthermore, a wall portion 16 projects at opposite ends of each of the longitudinal walls 12, 13. These wall portions 16 are folded towards the transverse walls 14, 15, then welded to those walls, in order to hold them in position the longitudinal walls 12, 13 against the transverse walls 14, 15 making it possible thereby to stiffen the freezing rack 4.

As case be clearly seen in FIG. 3, the base 17 of the longitudinal walls 13, 14, connected to the longitudinal sections 9, 10, forms a protuberance 18.

A gutter portion 19 projects from each longitudinal wall 12, 13. Each gutter portion 19 comprises a wing 20 extending transversely to the longitudinal walls 12, 13 as well as an inclined wing 21 extending from the wing 20 outwardly and towards the top of the freezing rack 4.

The freezing rack 4 is stackable with another similar freezing rack, as is illustrated in FIG. 4. Each protuberance 18 of a freezing rack disposed above another freezing rack is then accommodated in the corresponding gutter portion 19 of the other freezing rack disposed below.

More specifically, each protuberance 18 of the freezing rack bears on the wing 20 of the freezing rack below and comes to bear against the wing 21.

When several freezing racks 4 are stacked, the gutter portions 19 of one rack provide the lateral holding of the rack disposed above.

Furthermore, the freezing rack 4 is provided with two grasping feet 22 each emerging from a wall 14, 15, outwardly and towards the top of the freezing rack 4. The grasping feet 22 are each provided with holes 23 enabling the user to manipulate the freezing rack 4 while limiting the risk of the fingers sliding relative to the feet 22.

Each grasping lug 22 is disposed equidistant from the longitudinal walls 12, 13.

When stacking one freezing rack 4 on another similar freezing rack, each grasping lug 22 of the rack below holds the rack above in the longitudinal direction.

Furthermore, slots 24 are provided in the transverse walls 14, 15 at opposite ends of each of the grasping feet 22.

As indicated above, the freezing rack 4 has been specially designed to cooperate with accessories provided to facilitate the manipulation of the straws.

A description will now be given of an accessory to facilitate the putting in place of the plurality of straws 1 on the freezing rack 4, this being a support member 30 shown in FIG. 5.

The support member 30 is configured to be laid on a horizontal reception surface for example such as a table.

The support member 30 has a plate 31 and two flanges 37.

The plate 31 is of rectangular contour. It is delimited by two longitudinal faces 32, 33, two transverse faces 34, 35, an upper face and a lower face.

The upper face of the plate 31 forms a fluted surface 53 having a plurality of similar channels 36 provided side by side at a predetermined pitch.

Each channel 36 is configured to receive one straw 1 due to the fact that it is delimited by a surface having a curvature according to the diameter of a straw 1.

Each channel 36 is oriented in the direction of the width of the plate 31, that is to say in the transverse direction.

The channels 36 are disposed over the whole width of the upper face of the plate 31, that is to say from the longitudinal face 32 to the longitudinal face 33.

In the illustrated example, the plate 31 comprises one hundred and seventy-five channels 6 and can thus receive one hundred and seventy-five straws 1.

Broadly speaking, it is advantageous for the plate 31 to comprise between seventy and two hundred and five similar channels configured to accommodate that same number of straws 1.

The plate 31 has a width less than the length of the straws 1, i.e. 133 mm, such that when a straw 1 is placed centered or approximately centered in a channel 36, its end sections 26 and 27 jut on opposite sides for the plate 31.

Broadly speaking, it is advantageous for the plate 31 to have a width comprised between 80 and 90 mm.

The flanges 37 of the support member 30 are identical.

They are rigidly connected to the plate 31, here at each transverse end. The rigid connection is made here by screwing.

Each flange 37 comprises a central part 54 and two projecting parts 56.

The central part 54 is of rectangular general shape and is delimited by an upper surface 38, a lower surface 39 and two lateral surfaces 40 and 41.

The width of this central part 54, that is to say the distance between the two lateral surfaces 40, 41 constitutes the width of the plate 31.

The lower surface 39 of each of the flanges 37 bears on the reception surface like a table. The fastening of each of the flanges 37 on the plate 31 is made in the neighborhood of the upper surface 38 of each flange 37.

Thus, the plate 31 extends above and parallel to the horizontal reception surface on which rest the flanges 37 of the support member 30.

The plate 31 and the central part 54 of each of the flanges 37 are configured to be accommodated in the central free space 5 of the freezing rack 4, between the toothed walls 11 and 25. The projecting parts 56 extend at opposite ends of the central part 54 of the flanges 37. More specifically, each projecting part 56 emerges from one of the lateral surfaces 40, 41.

The first projecting part 56 comprises a foot 42 jutting from the lateral surface 40 at the base of the flange 37, with the lower face of the foot 42 here forming part of the lower surface 39 of the flange 37.

Figure 6:
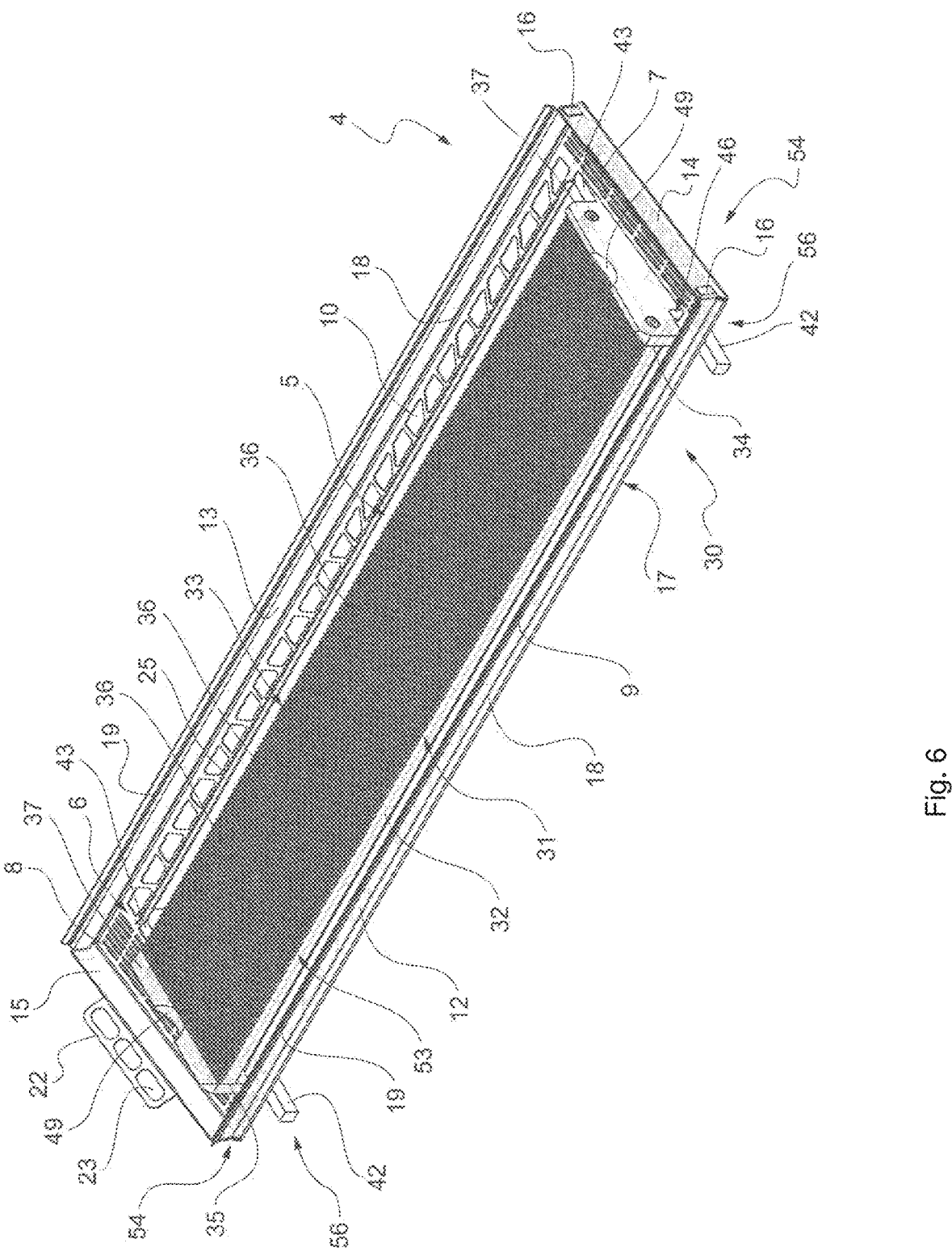
FIG. 6 is a perspective view of the support member and of the freezing rack in a relative position of putting straws in place on the plate of the support member.

The upper face of the foot 42 forms a bearing face 44 provided to receive one of the zones of the freezing rack 4 located at the junction of the bottom wall 6 and of the rim, in this case the protuberance 18 opposite the toothed wall 11, as can be seen in FIGS. 6 to 8.

The second projecting part 56 comprises a foot 43 jutting from the lateral surface 41, at the base of the flange 37 with the lower face of the foot 43 here forming part of the lower surface 39 of the flange 37.

The upper face of the foot 43 forms a bearing face 45 provided to receive one of the zones of the freezing rack 4 located at the junction of the bottom wall 6 and of one of the toothed walls 11, 25, here the toothed wall 24, as can be seen in FIGS. 6 to 8.

In the direction of the height, the bearing face 44 of each foot 42 is further away from the plate 31 than the bearing face 45 of each foot 43. Thus, when it is installed on the support member 30, the freezing rack 4 is inclined.

This inclination is such (see FIGS. 7 and 8) that the longitudinal wall 13 is at the same level as the upper surface of the plate 31 whereas the longitudinal wall 12 is below the upper surface of the plate 31.

A cut-out 46 is provided in each flange 37 set back from the lateral surface 40.

The cut-out 46 is delimited by a bearing face that extends onwards from the bearing face 44 of the foot 42, a back face 47 and an upper face 48. For each flange 37, the upper face 48 faces opposite the bearing face 44 and the back face is transverse to the bearing face 44 and to the upper face 48.

Each cut-out 46 is configured to accommodate one of the longitudinal sections 9 or 10 (section 9 in FIGS. 5 to 9) and the toothed wall 11 or 25 (the toothed wall 11 in FIGS. 5 to 9).

The depth of the cut-out 46 is predetermined and here corresponds to the distance between the toothed wall 11 and the longitudinal wall 12 as well as to the distance between the toothed wall 25 and the longitudinal wall 13 (here the distances between the toothed walls 11, 25 and respectively the longitudinal walls 12, 13 are equal).

In the relative position of putting the straws 1 in place on the plate 31 shown in FIGS. 6 and 7, the freezing rack 4 is received on the support member 30 with the toothed wall 11 engaging against the back face 47 of the cut-out 46.

In this position, in the transverse direction (direction of the width) of the plate 31, the longitudinal wall 13 is at a distance from the plate 31 while the longitudinal wall 12 is dose but as it is located below the upper surface of the plate 31, it does not hinder the access to that upper surface, which is more generally easy to access since the lateral wall 13 is at a distance from the plate 31.

The user can then easily spread the plurality of straws 1 over the fluted upper surface 53 of the plate 31, while taking care to center the straws roughly relative to the plate 31.

It will be noted that in the relative position of putting in place the straws 1 on the plate 31 shown in FIGS. 6 and 7, the distance between the lateral surface 41 and the toothed wall 25 is greater than the depth of the cut-out 46.

Figure 9:
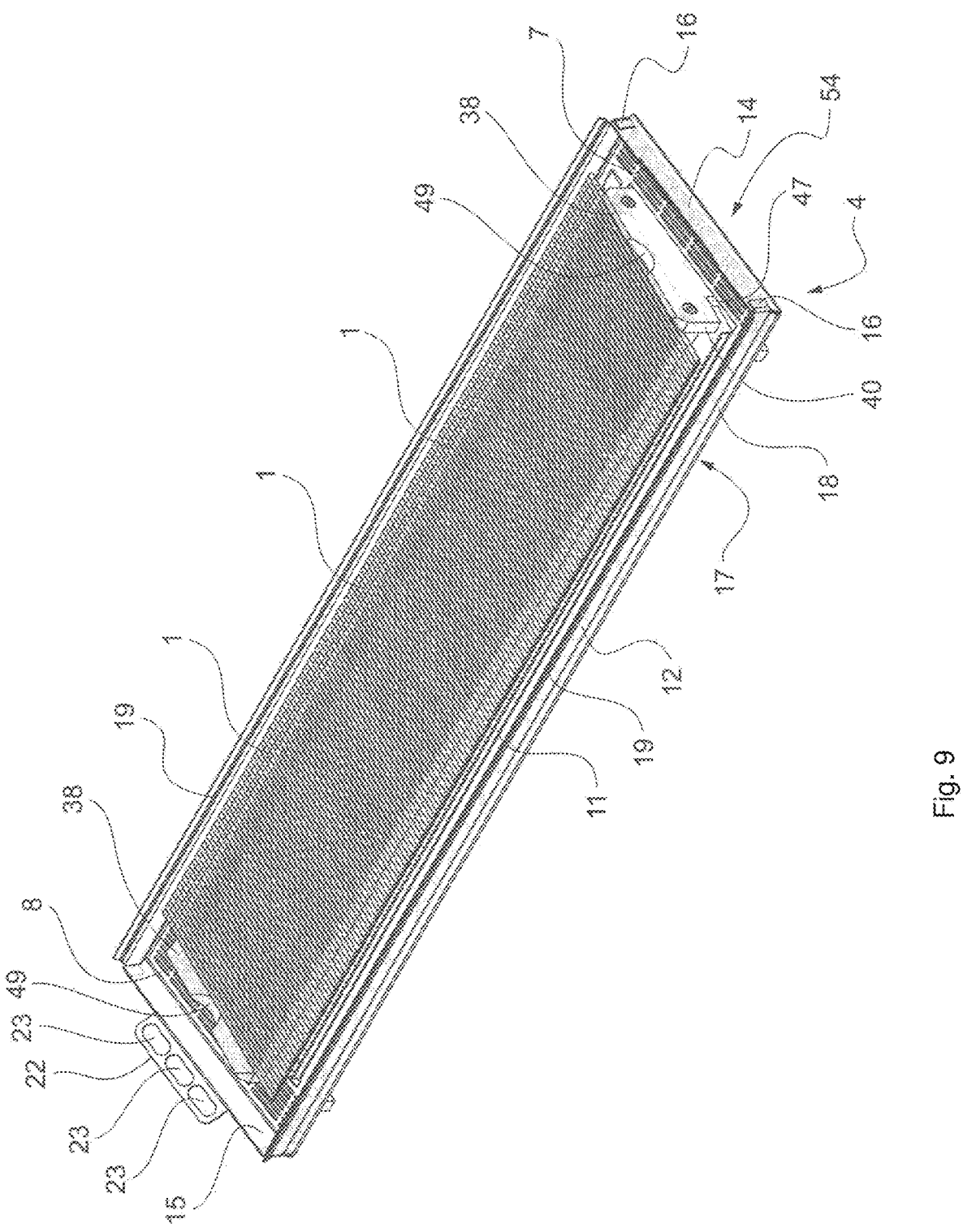
FIG. 9 is a perspective view of the support member of the freezing rack and of the straws in the position of FIG. 8.

Therefore, if the freezing rack 4 is slid over the bearing faces 44 and 45 in the direction which makes the toothed wall 11 come out of the cut-out 46 (towards the left in FIG. 7), the toothed wall 11 is out of the cut-out 46 when the toothed wall 25 comes to bear against the lateral surface 41, as is shown in FIGS. 8 and 9.

A position of longitudinal alignment of the straws has thus been entered, by them coming into contact against the longitudinal wall 13.

For some of the straws, this alignment is made at the time of the movement of the freezing rack 4 from the relative position of putting in place of the straws, since at the time of this movement the longitudinal wall 13 has come in contact with the straws which jut too much on its side then has remained in contact with them while pushing them. For the other straws (those which jut too far on the on the opposite side from the longitudinal wall 13), the user pushes them by hand so that they also come against the wall 13. All the straws are then aligned, since they each have one end along the wall 13, as can clearly be seen in FIG. 9.

The toothed wall 11, which is outside the cut-out 46, faces opposite the end sections 26 of the straws 1 while the toothed wall 25 faces opposite their end sections 27.

More specifically, the freezing rack 4 and the support member 30 are configured, in particular on account of the pitch of the set of toothing 29 of the walls 11 and 25 being the same as the pitch of the fluted surface 53 of the support member 30, such that each hollow 51 of the set of toothing 29 of the toothed wall 11 faces opposite the end section 26 of a straw 1 and such that each hollow 51 of the set of toothing 29 of the toothed wall 25 faces opposite the end section 27 of a straw 1.

Figure 10:
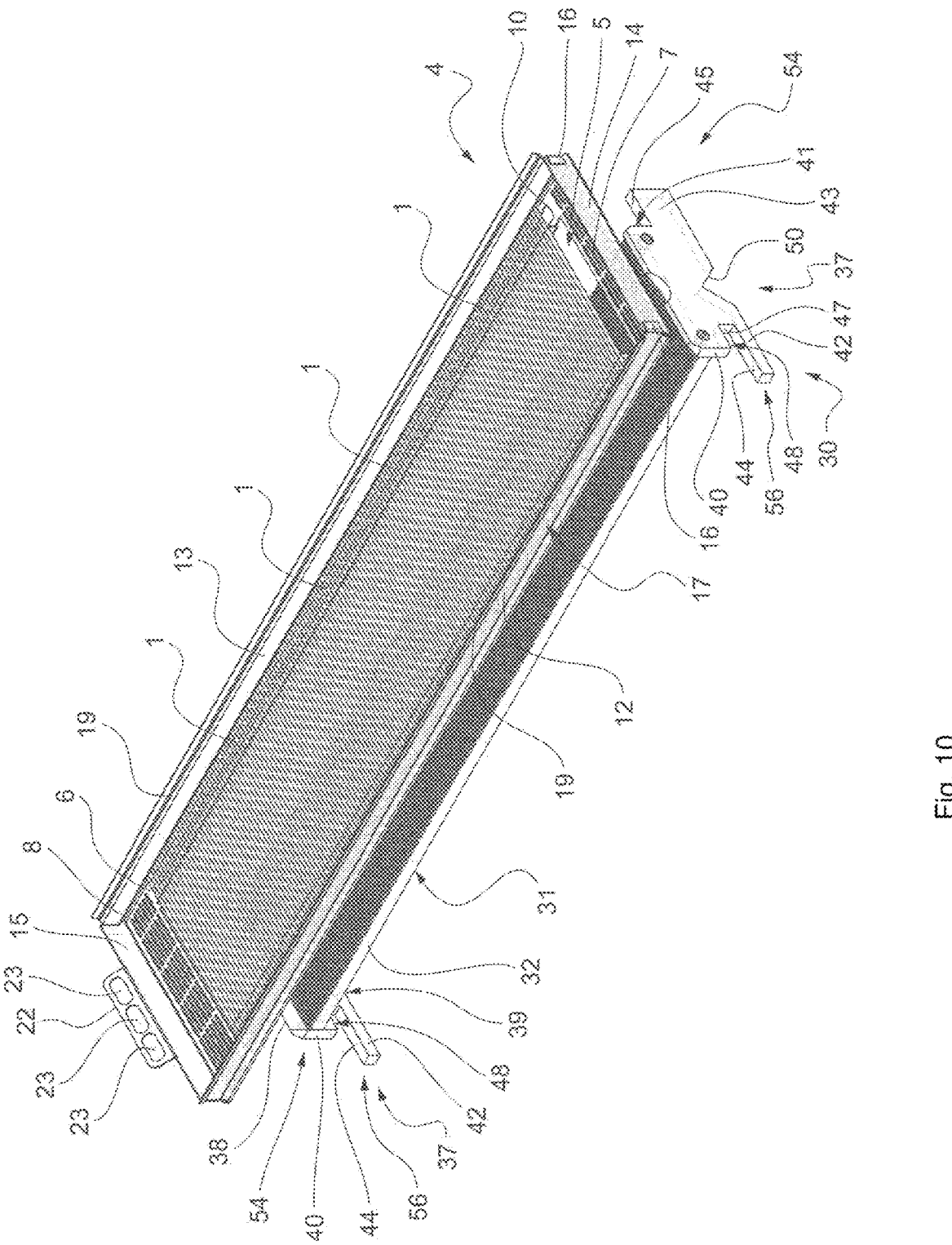
FIG. 10 is a similar view to FIG. 9 but with the straws put in place on the freezing rack, the transfer of the straws between the support member and the freezing rack having been carried out by raising the freezing rack from the position shown in FIGS. 8 and 9.

Thus, it suffices for the user to raise the freezing rack 4 for each end section 26, 27 of the straws to come to be accommodated in a hollow 51 of the set of toothing 29 of the toothed walls 11, 25, the straws 1 thus being put in place on the freezing rack 4, as can be seen in FIG. 10.

FIG. 10 shows a portion of toothed wall 11, 25 before raising the rack 4, when the straws 1 are disposed on the plate 31 and FIG. 11 shows this same portion of toothed wall 11, 25 after raising the rack 4, when the straws 1 are put in place in the set of toothing 29.

It will be noted that to simplify the drawings, only one of the grasping feet 22 of the rack 4 is illustrated in FIGS. 9 and 10.

It will be noted that each flange 37 here comprises cavity 49 provided in the upper surface 38 reaching to the plate 31. Each of these cavities 49 has a length and width making it possible to insert therein the finger of an adult hand.

Each cavity 49, disposed midway between the longitudinal faces 32, 33 of the plate 31, facilitates the spreading of the plurality of straws 1 on the fluted surface 53 of the plate 31 since it enables the user to place his or her finger there when depositing the plurality of straws into the plurality of channels 36 of the plate 31 in the neighborhood of each flange 37.

Each of the flanges 37 also comprises a cavity 50 provided in the lower surface 39 midway between each of the longitudinal faces 32, 33, of the plate 31. Each cavity 50 has a length and width making it possible to insert therein the finger of an adult hand.

The user can transport the support member by pinching the flanges 3r, by placing a finger in each cavity 49 and another finger in each cavity 50.

The actions made by the user to put the straws 1 in place on the freezing rack 4 will now be gone over.

First of all, the freezing rack 4 is disposed on the support member 30.

More specifically, the plate 31 and the central part of each of the flanges 37 are inserted into the central free space 5 of the freezing rack 4, with the support member 30 and the freezing rack 4 disposed in the position for putting in place the straws 1 on the plate 31 (FIGS. 6 and 7).

Next, the user places the plurality of straws in disorder on the fluted surface 53 of the plate 31. By spreading them over the surface, each straw 1 becomes inserted in a channel 36 of the plate 31, the using taking care to roughly center the straws 1 relative to the plate 31.

Once the straws 1 have been placed into the channels 36, the user imparts translational movement to the rack 4 to place it in position of longitudinal alignment of the straws (FIGS. 8 and 9).

The user then takes hold of the grasping feet 22 to raise the freezing rack 4. The straws are then put in place on the freezing rack 4 (FIG. 10).

It will be noted that in FIGS. 6 to 10 it is the toothed wall 11 which is on the same side as the cut-out 46 but that it could have been the toothed wall 25, the part of the freezing rack 4 located on one side of a vertically oriented longitudinal median plane being the mirror image of the part located on the other side.

In variants not illustrated, the dimensions of the plate are different, for example for the employment of straws of different diameter such as an inside diameter of 2.5 mm and an outside diameter of 2.85 mm with a tolerance of +/−0.05 mm.

Numerous other variants are possible according to circumstances, and in this connection, it is to be noted that the invention is not limited to the examples described and shown.

The invention claimed is:

1. A support member for a plurality of straws for packaging animal semen, each straw having a predetermined diameter and a predetermined length, the support member comprising a plate and two flanges rigidly connected to said plate and separated from each other by said plate, which has a width less than said predetermined length and comprising a fluted surface having a plurality of similar channels each of which is oriented in the direction of the width of the plate and each delimited by a surface having a curvature according to said predetermined diameter, said channels being disposed side by side with a predetermined pitch, said flanges being configured such that said support member can be placed on a horizontal reception surface with said fluted surface located atop the plate at a predetermined level above said reception surface, whereby each said channel can receive a straw of which an end section projects from said plate on each side, each flange comprising a central part as well as a first projecting part and a second projecting part each extending on one side of the central part, characterized in that the first projecting part comprises a first foot having a first bearing face and the second projecting part comprises a second foot having a second bearing face, said first bearing face and said second bearing face being turned upward when said support member is placed on said horizontal reception surface, said first bearing face being farther from said plate than said second bearing face in the upward direction, wherein the first projecting part and the second projecting part of each flange extend from the central part of each flange in directions that are not perpendicular to each other.

2. The support member according to claim 1, characterized in that a cut-out is provided in the central part of each flange perpendicular to said first bearing face.

3. The support member according to claim 2, characterized in that said cut-out has a predetermined depth and said first bearing face has a length at least equal to said depth.

4. The support member according to claim 3, characterized in that said second bearing face has a length at least equal to said depth.

5. The support member according to claim 1, characterized in that the plate comprises between seventy and two hundred and five channels.

6. An assembly comprising a support member for a plurality of straws for packaging animal semen, each straw having a predetermined diameter and a predetermined length, and further comprising a freezing rack of said plurality of straws, wherein:

the support member comprises a plate and two flanges rigidly connected to said plate, which has a width less than said predetermined length and comprising a fluted surface having a plurality of similar channels each of which is oriented in the direction of the width of the plate and each delimited by a surface having a curvature according to said predetermined diameter, said channels being disposed side by side with a predetermined pitch, said flanges being configured such that said support member can be placed on a horizontal reception surface with said fluted surface located atop the plate at a predetermined level above said reception surface, whereby each said channel can receive a straw of which an end section projects from said plate on each side, each flange comprising a central part as well as a first projecting part and a second projecting part each extending on one side of the central part, characterized in that the first projecting part comprises a first foot having a first bearing face and the second projecting part comprises a second foot having a second bearing face, said first bearing face and said second bearing face being turned upward when said support member is placed on said horizontal reception surface, said first bearing face being farther from said plate than said second bearing face in the upward direction; and the freezing rack comprises two toothed walls extending along a central free space, said support member and said freezing rack being configured such that said plate and a central part of each of the flanges of said support member can be inserted into said central free space, each toothed wall having a set of toothing at its apex comprising a succession of teeth and hollows, the sets of toothing of said toothed walls being identical, each hollow being delimited by a surface having a curvature according to said predetermined diameter, the pitch of said sets of toothing being identical to the predetermined pitch of said channels of said plate, the central free space of the freezing rack being configured to receive said plate and the central part of each of the flanges of the support member, each flange comprising, in addition to its central part, two projecting parts respectively a first projecting part and a second projecting part, extending on each side of said central part and being configured to receive the freezing rack, characterized in that said first projecting part comprises a first foot having a first bearing face and said second projecting part comprises a second foot having a second bearing face, said first bearing face and said second bearing face being turned upward when said support member is placed on said horizontal reception surface, said first bearing face being farther from said plate than said second bearing face, in the upward direction, such that the freezing rack disposed on the support member is inclined.

7. The assembly according to claim 6, characterized in that the freezing rack and the support member are configured to have a relative position of putting in place the straws and a position of aligning the straws, a cut-out being provided in each of the flanges perpendicular to the first bearing face.

8. The assembly according to claim 7, characterized in that the cut-out has a predetermined depth corresponding to at least a distance between one of the toothed walls and a longitudinal wall of the rack, in said relative position of putting in place the straws, said one of the toothed walls is configured to come into stopped engagement against a back face of said cut-out holding the other toothed wall at a distance from the plate, and in said position of aligning the straws another longitudinal wall is configured to come into contact with the straws.

9. The assembly according to claim 8, characterized in that said freezing rack comprises a bottom wall of frame form surrounding the central free space, said bottom wall being configured to connect said toothed walls to the longitudinal walls.

10. The assembly according to claim 9, characterized in that the second bearing face is provided to receive one of the zones of the freezing rack located at the junction of the bottom wall and of one of the toothed walls.

11. A support member for a plurality of straws for packaging animal semen, each straw having a predetermined diameter and a predetermined length, the support member comprising a plate and two flanges rigidly connected to said plate and separated from each other by said plate, which has a width less than said predetermined length and comprising a fluted surface having a plurality of similar channels each of which is oriented in the direction of the width of the plate and each delimited by a surface having a curvature according to said predetermined diameter, said channels being disposed side by side with a predetermined pitch, said flanges being configured such that said support member can be placed on a horizontal reception surface with said fluted surface located atop the plate at a predetermined level above said reception surface, whereby each said channel can receive a straw of which an end section projects from said plate on each side, each flange comprising a central part as well as a first projecting part and a second projecting part each extending on one side of the central part, characterized in that the first projecting part comprises a first foot having a first bearing face and the second projecting part comprises a second foot having a second bearing face, said first bearing face and said second bearing face being turned upward when said support member is placed on said horizontal reception surface, said first bearing face being farther from said plate than said second bearing face in the upward direction, wherein the first projecting part and the second projecting part of each flange are aligned with each other.

12. The support member according to claim 11, characterized in that a cut-out is provided in the central part of each flange perpendicular to said first bearing face.

13. The support member according to claim 12, characterized in that said cut-out has a predetermined depth and said first bearing face has a length at least equal to said depth.

14. The support member according to claim 13, characterized in that said second bearing face has a length at least equal to said depth.

15. The support member according to claim 11, characterized in that the plate comprises between seventy and two hundred and five channels.

16. A support member for a plurality of straws for packaging animal semen, each straw having a predetermined diameter and a predetermined length, the support member comprising a plate and two flanges rigidly connected to said plate and separated from each other by said plate, which has a width less than said predetermined length and comprising a fluted surface having a plurality of similar channels each of which is oriented in the direction of the width of the plate and each delimited by a surface having a curvature according to said predetermined diameter, said channels being disposed side by side with a predetermined pitch, said flanges being configured such that said support member can be placed on a horizontal reception surface with said fluted surface located atop the plate at a predetermined level above said reception surface, whereby each said channel can receive a straw of which an end section projects from said plate on each side, each flange comprising a central part as well as a first projecting part and a second projecting part each extending on one side of the central part, characterized in that the first projecting part comprises a first foot having a first bearing face and the second projecting part comprises a second foot having a second bearing face, said first bearing face and said second bearing face being turned upward when said support member is placed on said horizontal reception surface, said first bearing face being farther from said plate than said second bearing face in the upward direction, wherein the first projecting part and the second projecting part of each flange extend in the direction of the width of the plate.

17. The support member according to claim 16, characterized in that a cut-out is provided in the central part of each flange perpendicular to said first bearing face.

18. The support member according to claim 17, characterized in that said cut-out has a predetermined depth and said first bearing face has a length at least equal to said depth.

19. The support member according to claim 18, characterized in that said second bearing face has a length at least equal to said depth.

20. The support member according to claim 16, characterized in that the plate comprises between seventy and two hundred and five channels.

21. A support member for a plurality of straws for packaging animal semen, each straw having a predetermined diameter and a predetermined length, the support member comprising a plate and two flanges rigidly connected to said plate and separated from each other by said plate, which has a width less than said predetermined length and comprising a fluted surface having a plurality of similar channels each of which is oriented in the direction of the width of the plate and each delimited by a surface having a curvature according to said predetermined diameter, said channels being disposed side by side with a predetermined pitch, said flanges being configured such that said support member can be placed on a horizontal reception surface with said fluted surface located atop the plate at a predetermined level above said reception surface, whereby each said channel can receive a straw of which an end section projects from said plate on each side, each flange comprising a central part as well as a first projecting part and a second projecting part each extending on one side of the central part, characterized in that the first projecting part comprises a first foot having a first bearing face and the second projecting part comprises a second foot having a second bearing face, said first bearing face and said second bearing face being turned upward when said support member is placed on said horizontal reception surface, said first bearing face being farther from said plate than said second bearing face in the upward direction, wherein the first projecting part and the second projecting part extend in opposite directions from the central part of each flange.

22. The support member according to claim 21, characterized in that a cut-out is provided in the central part of each flange perpendicular to said first bearing face.

23. The support member according to claim 22, characterized in that said cut-out has a predetermined depth and said first bearing face has a length at least equal to said depth.

24. The support member according to claim 23, characterized in that said second bearing face has a length at least equal to said depth.

25. The support member according to claim 21, characterized in that the plate comprises between seventy and two hundred and five channels.

* * * * *